(12) United States Patent
Chen et al.

(10) Patent No.: US 10,142,997 B2
(45) Date of Patent: Nov. 27, 2018

(54) METHOD AND APPARATUS FOR ADJUSTING PHYSICAL RESOURCE, AND CONTROLLER

(71) Applicant: HUAWEI TECHNOLOGIES CO., LTD., Shenzhen (CN)

(72) Inventors: Qucai Chen, Shanghai (CN); Jianhui Yao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 577 days.

(21) Appl. No.: 14/951,629

(22) Filed: Nov. 25, 2015

(65) Prior Publication Data

US 2016/0081103 A1    Mar. 17, 2016

Related U.S. Application Data

(63) Continuation of application No. PCT/CN2013/076602, filed on May 31, 2013.

(51) Int. Cl.
| | |
|---|---|
| *G06F 15/173* | (2006.01) |
| *H04W 72/08* | (2009.01) |
| *H04L 12/24* | (2006.01) |
| *H04L 12/26* | (2006.01) |
| *G06F 9/50* | (2006.01) |
| *H04L 12/803* | (2013.01) |
| *H04L 12/911* | (2013.01) |

(52) U.S. Cl.
CPC ........ *H04W 72/085* (2013.01); *G06F 9/5083* (2013.01); *H04L 41/04* (2013.01);
(Continued)

(58) Field of Classification Search
CPC .. H04W 72/085; H04L 41/04; H04L 43/0817; H04L 47/125; H04L 47/822;
(Continued)

(56) References Cited

U.S. PATENT DOCUMENTS

| | | | |
|---|---|---|---|
| 2009/0228890 A1* | 9/2009 | Vaitovirta | ............. G06F 9/5027 718/104 |
| 2012/0198465 A1* | 8/2012 | Hande | ................... G06F 9/5022 718/104 |
| 2012/0257499 A1* | 10/2012 | Chatterjee | ......... H04W 28/0284 370/232 |

(Continued)

FOREIGN PATENT DOCUMENTS

| | | |
|---|---|---|
| CN | 101114927 A1 | 1/2008 |
| CN | 101447939 A | 6/2009 |

(Continued)

OTHER PUBLICATIONS

International Search Report dated Mar. 6, 2014 in corresponding International Patent Application No. PCT/CN2013/076602.

(Continued)

*Primary Examiner* — Liang Che A Wang
*Assistant Examiner* — Johnny B Aguiar
(74) *Attorney, Agent, or Firm* — Staas & Halsey LLP

(57) ABSTRACT

Embodiments of the present invention provide a method and apparatus for adjusting physical resource, where the method includes: collecting load information of a control plane CP and a user plane UP, and calculating, according to the corresponding load information, to obtain a load of the CP and a load of the UP; calculating a quantity of to-be-adjusted physical resources in the case that the load of the CP and the load of the UP meet a preset balancing adjustment condition; and adjusting physical resources of the CP and the UP according to the quantity of to-be-adjusted physical resources. By means of the present invention, a physical resource can be adjusted and allocated automatically according to load statuses of a CP and a UP, so that balancing a load of a device, promoting usage of the device, and reducing a possibility that the CP and the UP are overloaded.

10 Claims, 8 Drawing Sheets

(52) U.S. Cl.
CPC ........ *H04L 43/0817* (2013.01); *H04L 47/125* (2013.01); *H04L 47/822* (2013.01); *H04L 41/0816* (2013.01); *H04L 43/0888* (2013.01); *H04L 43/16* (2013.01)

(58) Field of Classification Search
CPC . H04L 41/0816; H04L 43/0888; H04L 43/16; G06F 9/5083
USPC ........................................ 709/223, 224, 226
See application file for complete search history.

(56) References Cited

U.S. PATENT DOCUMENTS

| | | | |
|---|---|---|---|
| 2015/0223252 A1* | 8/2015 | Yan ...................... | H04W 24/08 455/452.1 |
| 2015/0245238 A1* | 8/2015 | Zhang ............... | H04W 28/0284 370/230 |

FOREIGN PATENT DOCUMENTS

| | | | |
|---|---|---|---|
| EP | 2 375 658 A1 | 10/2011 | |
| EP | 2 592 863 A1 | 5/2013 | |

OTHER PUBLICATIONS

Extended European Search Report dated Mar. 22, 2016 in corresponding European Patent Application No. 13885716.4.
International Search Report dated Mar. 6, 2014, in corresponding International Application No. PCT/CN2013/076602.

* cited by examiner

METHOD AND APPARATUS FOR ADJUSTING PHYSICAL RESOURCE, AND CONTROLLER

CROSS-REFERENCE TO RELATED APPLICATIONS

This application is a continuation of International Application No. PCT/CN2013/076602, filed on May 31, 2013, which is hereby incorporated by reference in its entirety.

TECHNICAL FIELD

The present invention relates to the field of electronic technologies, and in particular, to a method and an apparatus for adjusting a physical resource, and a controller.

BACKGROUND

In a general model of a UTRAN (universal mobile telecommunications system terrestrial radio access network), functions of a radio network layer may be divided into two parts: a CP (control plane) function and a UP (user plane) function.

In the prior art, the CP and UP functions are generally carried by using different physical boards, for example, boards including two types: a CP board and a UP board. An operator needs to purchase a certain quantity of CP boards and a certain quantity of UP boards according to predictions. However, it is difficult to accurately predict a CP/UP capability requirement. Therefore, when the predictions are not accurate, one type of board is wasted, and the other type of board is insufficient. If adjustment needs to be performed, the type of board that is insufficient needs to be purchased again, so that an adjustment cycle is long. In addition, manual intervention is required in an adjustment process, which causes a service interruption.

SUMMARY

Embodiments of the present invention provide a method and an apparatus for adjusting a physical resource, so that a physical resource can be adjusted and allocated automatically to load statuses of CP and UP.

According to a first aspect, an embodiment of the present invention provides a method for adjusting a physical resource, including:

collecting load information of a CP from a control plane CP board, collecting load information of a UP from a user plane UP board, and obtaining, according to the corresponding load information, that a CP workload and a UP workload;

calculating a quantity of to-be-adjusted physical resources in the case that the CP workload and the UP workload meet a preset balancing adjustment condition; and adjusting physical resources of the CP and the UP according to the quantity of to-be-adjusted physical resources that is obtained through calculation.

With reference to the first aspect, in a first possible implementation manner, the adjusting physical resources of the CP and the UP according to the quantity of to-be-adjusted physical resources that is obtained through calculation includes:

automatically adjusting the physical resources of the CP and the UP according to the quantity of to-be-adjusted physical resources that is obtained through calculation; or includes:

sending adjustment instruction information according to the quantity of to-be-adjusted physical resources that is obtained through calculation, to instruct a user to adjust the physical resources of the CP and the UP according to the quantity of to-be-adjusted physical resources that is obtained through calculation.

With reference to the first aspect or the first possible implementation manner of the first aspect, in a second possible implementation manner, the collecting load information of a CP from a control plane CP board, collecting load information of a UP from a user plane UP board, and obtaining, according to the corresponding load information, that a CP workload and a UP workload includes:

collecting the load information of the CP from the control plane CP board, collecting the load information of the UP from the user plane UP board, and obtaining a corresponding CP load capacity and a corresponding UP load capacity, where the load information includes any one or more of the following: CPU usage, a quantity of users, and throughput; and using a maximum value in CP load capacities in a preset time cycle or an average value of the load capacities as the workload of the CP, and using a maximum value in UP load capacities in the preset time cycle or an average value of the load capacities as the workload of the UP.

With reference to the first aspect, the first possible implementation manner of the first aspect, or the second possible implementation manner of the first aspect, in a third possible implementation manner, the calculating a quantity of to-be-adjusted physical resources in the case that the CP workload and the UP workload meet a preset balancing adjustment condition includes:

determining, in the case that the CP workload and the UP workload meet the preset balancing adjustment condition, a quantity of CP physical resources currently allocated to the CP and a quantity of UP physical resources currently allocated to the UP; and calculating the quantity of to-be-adjusted physical resources according to the quantity of CP physical resources currently allocated to the CP, the CP workload, the quantity of UP physical resources currently allocated to the UP, and the UP workload.

With reference to the third possible implementation manner of the first aspect, in a fourth possible implementation manner, the calculating a quantity of to-be-adjusted physical resources includes:

calculating the quantity of to-be-adjusted physical resources, so that an absolute value of a difference between or a ratio of a load value which is obtained by sharing a current total workload of the CP on each CP physical resource that is obtained after adjusting is performed according to the quantity of to-be-adjusted physical resources, and a load value which is obtained by sharing a current total workload of the UP on each UP physical resource that is obtained after adjusting is performed according to the quantity of to-be-adjusted physical resources is within a preset range threshold.

With reference to the fourth possible implementation manner of the first aspect, in a fifth possible implementation manner, the quantity of to-be-adjusted physical resources is calculated according to the following calculation formula:

$$\frac{Num_A \times ALoad_{work}}{Num_A + X} = \frac{Num_B \times BLoad_{work}}{Num_B - X},$$

where $Num_A$ is a quantity of physical resources currently allocated to a scarce plane of the CP and the UP, $ALoad_{work}$ is a workload of the scarce plane of the CP and the UP, $Num_B$ is a quantity of physical resources currently allocated to a redundant plane of the CP and the UP, $BLoad_{work}$ is a workload of the redundant plane of the CP and the UP, and X is the quantity of to-be-adjusted physical resources.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, that the CP workload and the UP workload meet the preset balancing adjustment condition refers to that an absolute value of a difference between or a ratio of the CP workload and the UP workload is beyond a preset range threshold.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, the adjusting physical resources of the CP and the UP according to the quantity of to-be-adjusted physical resources that is obtained through calculation includes:

in the case that the CP is used as the redundant plane, changing a logic type of boards, which are in boards of the CP and whose quantity is indicated by the quantity of to-be-adjusted physical resources, into a UP logic type to implement a UP function; or in the case that the UP is used as the redundant plane, changing a logic type of boards, which are in boards of the UP and whose quantity is indicated by the quantity of to-be-adjusted physical resources, into a CP logic type to implement a CP function.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in an eighth possible implementation manner, the adjusting physical resources of the CP and the UP according to the quantity of to-be-adjusted physical resources that is obtained through calculation includes:

in the case that the CP is used as the redundant plane, modifying a software configuration, deleting, according to the software configuration, CP software instances whose quantity corresponds to the quantity of to-be-adjusted physical resources, and creating, on physical resources that become idle, UP software instances whose quantity corresponds to the quantity of to-be-adjusted physical resources; or in the case that the UP is used as the redundant plane, modifying a software configuration, deleting, according to the software configuration, UP software instances whose quantity corresponds to the quantity of to-be-adjusted physical resources, and creating, on physical resources that become idle, CP software instances whose quantity corresponds to the quantity of to-be-adjusted physical resources.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a ninth possible implementation manner, the adjusting physical resources of the CP and the UP according to the quantity of to-be-adjusted physical resources that is obtained through calculation includes:

in the case that the CP is used as the redundant plane, reducing, according to an indication of the quantity of to-be-adjusted physical resources, a quantity of physical resources used by CP software instances, and allocating, to UP software instances for use, physical resources whose quantity corresponds to a quantity of to-be-adjusted physical resources that become idle; or in the case that the UP is used as the redundant plane, reducing, according to an indication of the quantity of to-be-adjusted physical resources, a quantity of physical resources used by UP software instances, and allocating, to CP software instances for use, physical resources whose quantity corresponds to a quantity of to-be-adjusted physical resources that become idle.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner, before the adjusting physical resources of the CP and the UP according to the quantity of to-be-adjusted physical resources that is obtained through calculation, the method further includes:

determining a to-be-adjusted physical resource according to the quantity of to-be-adjusted physical resources that is obtained through calculation; and prohibiting allocating a new service to the determined to-be-adjusted physical resource and waiting for a service that has been deployed on the determined to-be-adjusted physical resource to be terminated.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in an eleventh possible implementation manner, the redundant plane refers to a plane of the CP and the UP that has a smaller workload obtained by comparing the acquired CP workload with the acquired UP workload; and the scarce plane refers to a plane of the CP and the UP that has a larger workload obtained by comparing the acquired CP workload with the acquired UP workload.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the eleventh possible implementation manner of the first aspect, in a twelfth possible implementation manner, the adjusting physical resources of the CP and the UP according to the quantity of to-be-adjusted physical resources that is obtained through calculation includes:

submitting the quantity of to-be-adjusted physical resources to an operating system OS for automatic scheduling by the OS; or performing virtualization adjustment according to the quantity of to-be-adjusted physical resources; or performing cloud computing adjustment according to the quantity of to-be-adjusted physical resources.

According to a second aspect, an embodiment of the present invention provides an apparatus for adjusting a physical resource, including:

a collecting module, configured to collect load information of a CP from a control plane CP board, collect load information of a UP from a user plane UP board, and obtain, according to the corresponding load information, that a CP workload and a UP;

a calculating module, configured to calculate a quantity of to-be-adjusted physical resources in the case that the CP workload and the UP workload meet a preset balancing adjustment condition; and an adjusting module, configured to adjust physical resources of the CP and the UP according to the quantity of to-be-adjusted physical resources that is obtained through calculation.

With reference to the second aspect, in a first possible implementation manner, the adjusting module includes:

an adjusting unit, configured to automatically adjust the physical resources of the CP and the UP according to the quantity of to-be-adjusted physical resources that is obtained through calculation;

or includes:

an instructing unit, configured to send adjustment instruction information according to the quantity of to-be-adjusted physical resources that is obtained through calculation, to instruct a user to adjust the physical resources of the CP and the UP according to the quantity of to-be-adjusted physical resources that is obtained through calculation.

With reference to the second aspect or the first possible implementation manner of the first aspect, in a second possible implementation manner, the collecting module includes:

an acquiring unit, configured to collect the load information of the CP from the control plane CP board, collect the load information of the UP from the user plane UP board, and determine a corresponding CP load capacity and a corresponding UP load capacity, where the load information includes any one or more of the following: CPU usage, a quantity of users, and throughput; and a recording unit, configured to use a maximum value in CP load capacities in a preset time cycle or an average value of the load capacities as the workload of the CP, and use a maximum value in UP load capacities in the preset time cycle or an average value of the load capacities as the workload of the UP.

With reference to the second aspect, the first possible implementation manner of the second aspect, or the second possible implementation manner of the second aspect, in a third possible implementation manner, the calculating module includes:

a determining unit, configured to determine, in the case that the CP workload and the UP workload meet the preset balancing adjustment condition, a quantity of CP physical resources currently allocated to the CP and a quantity of UP physical resources currently allocated to the UP; and a calculating unit, configured to calculate the quantity of to-be-adjusted physical resources according to the quantity of CP physical resources currently allocated to the CP, the CP workload, the quantity of UP physical resources currently allocated to the UP, and the UP workload.

With reference to the third possible implementation manner of the second aspect, in a fourth possible implementation manner, the calculating unit is specifically configured to calculate the quantity of to-be-adjusted physical resources, so that an absolute value of a difference between or a ratio of a load value which is obtained by sharing a current total workload of the CP on each CP physical resource that is obtained after adjusting is performed according to the quantity of to-be-adjusted physical resources, and a load value which is obtained by sharing a current total workload of the UP on each UP physical resource that is obtained after adjusting is performed according to the quantity of to-be-adjusted physical resources is within a preset range threshold.

With reference to the third possible implementation manner of the second aspect, in a fifth possible implementation manner, the calculating module further includes:

a condition calculating unit, configured to calculate an absolute value of a difference between or a ratio of the CP workload and the UP workload; and a judging unit, configured to determine whether a result obtained through calculation by the condition calculating unit is beyond the preset range threshold, where if the result is beyond the preset range threshold, the CP workload and the UP workload meet the preset balancing adjustment condition, and notify the determining unit.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, the adjusting module is specifically configured to: in the case that the CP is used as the redundant plane, change a logic type of boards, which are in boards of the CP and whose quantity is indicated by the quantity of to-be-adjusted physical resources, into a UP logic type to implement a UP function; or in the case that the UP is used as the redundant plane, change a logic type of boards, which are in boards of the UP and whose quantity is indicated by the quantity of to-be-adjusted physical resources, into a CP logic type to implement a CP function.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a seventh possible implementation manner, the adjusting module is specifically configured to: in the case that the CP is used as the redundant plane, modify a software configuration, delete, according to the software configuration, CP software instances whose quantity corresponds to the quantity of to-be-adjusted physical resources, and create, on physical resources that become idle, of UP software instances whose quantity corresponds to the quantity of to-be-adjusted physical resources; or in the case that the UP is used as the redundant plane, modify a software configuration, delete, according to the software configuration, UP software instances whose quantity corresponds to the quantity of to-be-adjusted physical resources, and create, on physical resources that become idle, CP software instances whose quantity corresponds to the quantity of to-be-adjusted physical resources.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in an eighth possible implementation manner, the adjusting module is specifically configured to: in the case that the CP is used as the redundant plane, reduce, according to an indication of the quantity of to-be-adjusted physical resources, a quantity of physical resources used by CP software instances, and allocate, to UP software instances for use, physical resources whose quantity corresponds to a quantity of to-be-adjusted physical resources that become idle; or in the case that the UP is used as the redundant plane, reduce, according to an indication of the quantity of to-be-adjusted physical resources, a quantity of physical resources used by UP software instances, and allocate, to CP software instances for use, physical resources whose quantity corresponds to a quantity of to-be-adjusted physical resources that become idle.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner, the apparatus further includes:

a determining module, configured to determine a to-be-adjusted physical resource according to the quantity of to-be-adjusted physical resources that is obtained through calculation; and a control module, configured to prohibit allocating a new service to the determined to-be-adjusted physical resource and wait for a service that has been deployed on the determined to-be-adjusted physical resource to be terminated.

According to a third aspect, an embodiment of the present invention further provides a controller, including a control board, a CP board, and a UP board, where:

the control board is configured to collect load information of CP from the CP board, collect load information of UP from the UP board, and obtain, according to the corresponding load information, that a CP workload and a UP; calculate a quantity of to-be-adjusted physical resources in the case that the CP workload and the UP workload meet a preset balancing adjustment condition; and adjust physical resources of the CP board and the UP board according to the quantity of to-be-adjusted physical resources that is obtained through calculation.

With reference to the third aspect, in a first possible implementation manner, the control board includes the apparatus for adjusting a physical resource according to the second aspect.

Implementation of the embodiments of the present invention has the following beneficial effects:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
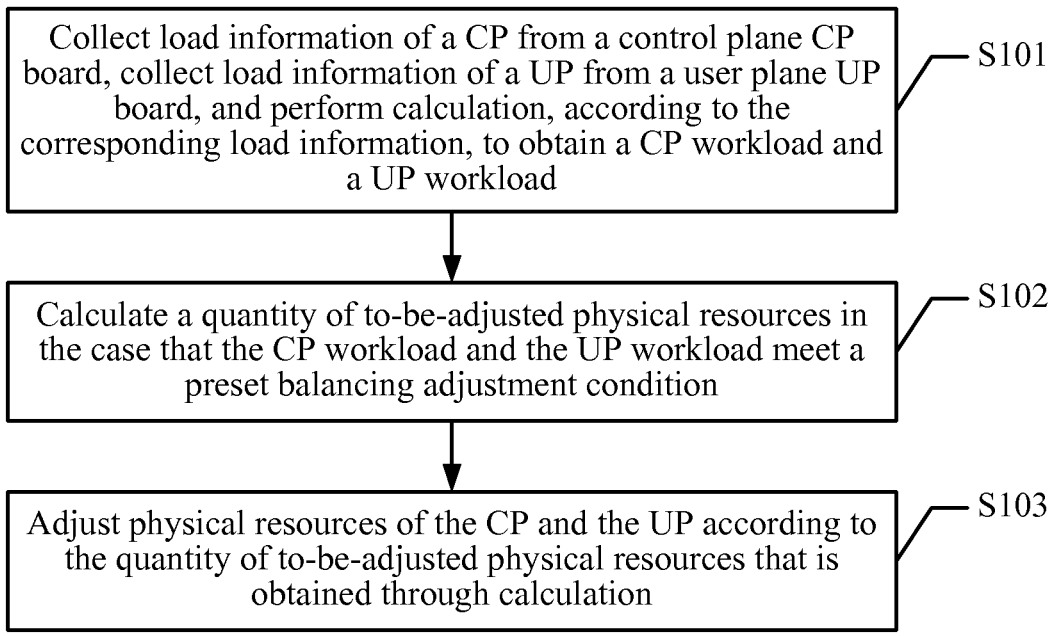
FIG. 1 is a schematic flowchart of a method for adjusting a physical resource according to an embodiment of the present invention.

Referring to FIG. 1, FIG. 1 is a schematic flowchart of a method for adjusting a physical resource according to an embodiment of the present invention. The method in this embodiment of the present invention may be implemented by, for example, a device such as a controller. The controller may be, for example, a BSC (base station controller) or an RNC (radio network controller), which is not limited in this embodiment of the present invention. Specifically, the method includes:

S101: Collect load information of a CP from a control plane CP board, collect load information of a UP from a user plane UP board, and perform calculation, according to the corresponding load information, to obtain a CP workload and a UP workload.

A CP may be used to implement application protocols including an RANAP (radio access network application part), an RNSAP (radio network subsystem application part), an NBAP (base station application part), transport bearer signaling protocol, and the like, and is responsible for establishment and maintenance of bearers such as an RAB (radio access bearer), an RB (radio bearer), and an RL (radio link).

A UP may be used to carry an output stream and data for an application of an end user.

The CP may include several software instances and physical resources (such as a CPU) used to carry the several software instances, and the software instances are used to implement a logical function of a control plane of a radio access network. The UP may also include several software instances and physical resources (such as a CPU) used to carry the several software instances, and the software instances are used to implement a logical function of a user plane of the radio access network.

The load information of the control plane CP and that of the user plane UP, may include, but is not limited to, for example, one piece of or any combination of information such as CPU usage, a quantity of users, and throughput. The CP workload and the UP workload in S101 may refer to a load of the CP when the CP is busy and a load of the UP when the UP is busy; or an average CP load and an average UP load.

The load of the CP when the CP is busy and the load of the UP when the UP is busy refer to a maximum load of the CP and that of the UP within a period of time, for example, one or any combination of the following: maximum CPU usage, a maximum quantity of users, and maximum throughput of the CP and those of the UP in two days. In S101, the load information may be collected and recorded in a preset time interval, and a maximum load value may be determined in the preset time interval, so that the load of the CP when the CP is busy and the load of the UP when the UP is busy may be obtained. For example, the preset time interval may be 15 minutes, load statuses of the UP and the CP in the time interval are collected every 15 minutes (for example, an average load of 10 CPUs of the CP or the UP when the 10 CPUs are busy in the 15 minutes), and a maximum load of UP loads and a maximum load of CP loads in the preset time interval that are collected in two days are used as the load of the UP when the UP is busy and the load of the CP when the CP is busy respectively.

The average CP load and the average UP load refer to an average load of the CP and that of the UP within a period of time, for example, one or any combination of the following: average CPU usage, an average quantity of users, and average throughput of the CP and those of the UP in two days. In S101, the load information may be collected and recorded in a preset time interval, CP and UP loads in the preset time interval may be determined, and all CP and UP loads in the preset time interval that are collected in a time cycle of an adjustment are averaged, so that the average CP load and the average UP load may be obtained. For example, the preset time interval is 15 minutes, load statuses of the UP and CP in the preset time interval are collected every 15 minutes, and all UP and CP loads in 15 minutes that are collected in two days are averaged and averages are used as the average CP load and the average UP load.

S102: Calculate a quantity of to-be-adjusted physical resources in the case that the CP workload and the UP workload meet a preset balancing adjustment condition.

That the CP workload and the UP workload meet the preset balancing adjustment condition may refer to that an absolute value of a difference between or a ratio of the CP workload and the UP workload is beyond a preset range threshold. That is, one workload is greater than the other workload. In the case that the two values are equal or approximately equal (the difference between or the ratio of the two values is within the range threshold), the balancing adjustment condition is not met, and balance adjustment is not required.

A plane in the CP and the UP that has a smaller workload is a redundant plane, and a physical resource in the redundant plane is redundant and may be adjusted and invoked to the other plane for use. A plane with a larger workload is a scarce plane. The quantity of to-be-adjusted physical resources that is obtained through calculation in S102 is used to indicate a quantity of physical resources invoked from the redundant plane to the scarce plane, such as a quantity of CPUs.

The calculating a quantity of to-be-adjusted physical resources may be directly using all unused physical resources on the redundant plane as the quantity of to-be-adjusted physical resources according to a workload of the redundant plane; or calculating the quantity of to-be-adjusted physical resources only according to a physical resource requirement of the scarce plane; or calculating the quantity of to-be-adjusted physical resources according to a quantity of CP physical resources allocated to the CP, the CP workload, a quantity of UP physical resources currently allocated to the UP, and the UP workload.

S103: Adjust physical resources of the CP and the UP according to the quantity of to-be-adjusted physical resources that is obtained through calculation.

A specific adjusting manner includes, but is not limited to, any one or more of the following manners: automatically changing a logic type of a board, modifying a software configuration, modifying a binding relationship between a service and a physical resource, submitting a resource to an operating system OS for automatic scheduling by the OS, performing virtualization, and performing cloud computing.

Specifically, the adjusting in S103 may include: in the case that the CP is used as the redundant plane, changing a logic type of boards, which are in boards of the CP and whose quantity is indicated by the quantity of to-be-adjusted physical resources, into a UP logic type to implement a UP function; or in the case that the UP is used as the redundant plane, changing a logic type of boards, which are in boards of the UP and whose quantity is indicated by the quantity of to-be-adjusted physical resources, into a CP logic type to implement a CP function.

Alternatively, the adjusting in S103 may include: in the case that the CP is used as the redundant plane, modifying a software configuration, deleting, according to the software configuration, CP software instances whose quantity corresponds to the quantity of to-be-adjusted physical resources, and creating, on physical resources that become idle, UP software instances whose quantity corresponds to the quantity of to-be-adjusted physical resources; or in the case that the UP is used as the redundant plane, modifying a software configuration, deleting, according to the software configuration, UP software instances whose quantity corresponds to the quantity of to-be-adjusted physical resources, and creating, on physical resources that become idle, CP software instances whose quantity corresponds to the quantity of to-be-adjusted physical resources.

Alternatively, the adjusting in S103 may include: in the case that the CP is used as the redundant plane, reducing, according to an indication of the quantity of to-be-adjusted physical resources, a quantity of physical resources used by CP software instances, and allocating, to UP software instances for use, physical resources whose quantity corresponds to a quantity of to-be-adjusted physical resources that become idle; or in the case that the UP is used as the redundant plane, reducing, according to an indication of the quantity of to-be-adjusted physical resources, a quantity of physical resources used by UP software instances, and allocating, to CP software instances for use, physical resources whose quantity corresponds to a quantity of to-be-adjusted physical resources that become idle.

Further, before performing the adjusting in S103, the method further includes:

determining a to-be-adjusted physical resource according to the quantity of to-be-adjusted physical resources that is obtained through calculation; and prohibiting allocating a new service to the determined to-be-adjusted physical resource and waiting for a service that has been deployed on the determined to-be-adjusted physical resource to be terminated.

That is, a shutdown Shutdown operation may be further performed according to the quantity of to-be-adjusted physical resources that is obtained through calculation, that is, a new user is prohibited from being allocated to the to-be-adjusted physical resource (may be allocated to other physical resources that are not adjusted), and wait for an old user (a user who has been deployed on these to-be-adjusted physical resources) to hang up naturally, and adjustment and allocation are then performed. In this way, the adjusting process does not interrupt a call of an existing user, a new user may also perform access normally, and the entire adjusting process does not adversely affect the end user.

In addition, S103 in this embodiment of the present invention may be specifically automatically adjusting physical resources of the CP and the UP according to the quantity of to-be-adjusted physical resources that is obtained through calculation.

Certainly, in another embodiment, S103 may also include: sending adjustment instruction information according to the quantity of to-be-adjusted physical resources that is obtained through calculation, to instruct a user to adjust the physical resources of the CP and the UP according to the quantity of to-be-adjusted physical resources that is obtained through calculation, where the user is mainly an operation and maintenance engineer.

It can be known from the description of the foregoing embodiment that the present invention has the following beneficial effects:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded.

Figure 2:
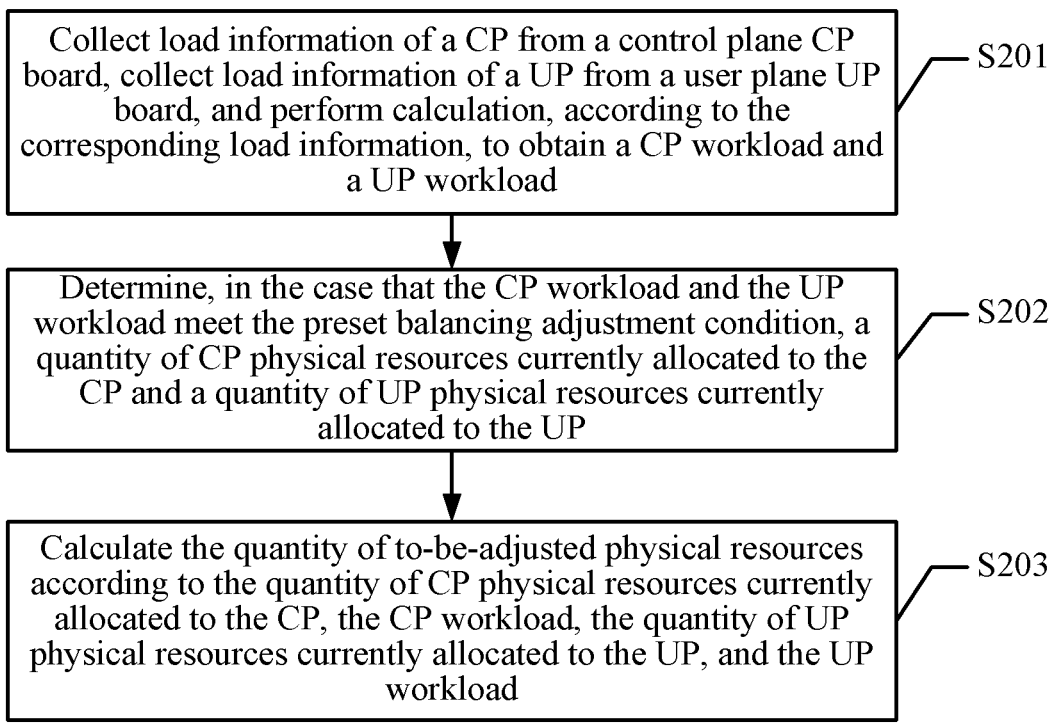
FIG. 2 is a schematic flowchart of another method for adjusting a physical resource according to an embodiment of the present invention.

Further referring to FIG. 2, FIG. 2 is a schematic flowchart of another method for adjusting a physical resource according to an embodiment of the present invention. The method of this embodiment of the present invention may be implemented by using a device such as a network controller in a 3G/2G network. Specifically, the method includes:

S201: Collect load information of a CP from a control plane CP board, collect load information of a UP from a user plane UP board, and perform calculation, according to the corresponding load information, to obtain a CP workload and a UP workload.

For description of the CP, the UP, the CP workload, and the UP workload in this embodiment of the present invention, refer to the description in S101 in the foregoing embodiment, which is not described herein again.

The load information of the CP and that of the UP may be actively reported by the CP board and the UP board (which may be a unified board or two separated boards), or may be load information fed back to a device such as a network controller by the CP board and the UP board in response to a load collecting request after the device such as the controller initiates the load collecting request to the CP board and the UP board.

S202: Determine, in the case that the CP workload and the UP workload meet the preset balancing adjustment condition, a quantity of CP physical resources currently allocated to the CP and a quantity of UP physical resources currently allocated to the UP.

Whether the CP workload and the UP workload are balanced is first determined, and if the CP workload and the UP workload are unbalanced, that is, if the workload of one plane is larger, and the workload of the other plane is smaller, it may be considered that the balancing adjustment condition is met.

The quantity of CP physical resources allocated to the CP and the quantity of UP physical resources allocated to the UP may be a quantity of CP physical resources allocated to the CP and a quantity of UP physical resources allocated to the UP respectively that are recorded after a network controller is established, or a quantity of CP physical resources and a quantity of UP physical resources that are recorded after a previous adjustment of physical resources.

S203: Calculate the quantity of to-be-adjusted physical resources according to the quantity of CP physical resources currently allocated to the CP, the CP workload, the quantity of UP physical resources currently allocated to the UP, and the UP workload.

In this embodiment of the present invention, the calculating a quantity of to-be-adjusted physical resources includes: calculating the quantity of to-be-adjusted physical resources, so that an absolute value of a difference between or a ratio of a load value which is obtained by sharing a current total workload of the CP on each CP physical resource that is obtained after adjusting is performed according to the quantity of to-be-adjusted physical resources, and a load value which is obtained by sharing a current total workload of the UP on each UP physical resource that is obtained after adjusting is performed according to the quantity of to-be-adjusted physical resources is within a preset range threshold.

Specifically, a specific calculation formula for calculating the quantity of to-be-adjusted physical resources may include:

$$\frac{Num_A \times ALoad_{work}}{Num_A + X} = \frac{Num_B \times BLoad_{work}}{Num_B - X}, \qquad \text{formula 1}$$

where $Num_A$ is a quantity of physical resources allocated to a scarce plane of the CP and the UP, $ALoad_{work}$ is a workload of the scarce plane of the CP and the UP, $Num_B$ is a quantity of physical resources allocated to a redundant plane of the CP and the UP, $BLoad_{work}$ is a workload of the redundant plane of the CP and the UP, and X is the quantity of to-be-adjusted physical resources.

In formula 1, in the case that the CP is the scarce plane, the UP is the redundant plane, and in the case that the workload refers to a load in busy hours, a specific calculation formula is the following formula 2:

$$\frac{Num_{CP} \times CPLoad_{busy}}{Num_{CP} + X} = \frac{Num_{UP} \times UPLoad_{busy}}{Num_{UP} - X}, \quad \text{formula 2}$$

where $Num_{CP}$ is a quantity of CP physical resources currently allocated to the CP, $CPLoad_{busy}$ is a load of the CP when the CP is busy, $Num_{UP}$ is a quantity of UP physical resources currently allocated to the UP, $UPLoad_{busy}$ is a load of the UP when the UP is busy, and X is the quantity of to-be-adjusted physical resources.

In the foregoing formula 1, $Num_{CP} \times CPLoad_{busy}$ in the expression on the left side of the equal sign indicates a total load of the CP in the case that physical resources currently allocated to the CP are all under maximum loads (loads of the CP when the CP is busy), and the expression on the left indicates a load of the total workload after X physical resources are increased for the CP, where the load is shared on each physical resource. Likewise, $Num_{UP} \times UPLoad_{busy}$ in the expression on the right side of the equal sign in formula 1 indicates a total load of the UP in the case that physical resources currently allocated to the UP are all under maximum loads (loads of the UP when the UP is busy), and the expression on the right indicates a load of a total workload after X physical resources are reduced for the CP, where the load is shared on each physical resource. Likewise, in the case that the UP is the scarce plane, and the CP is the redundant plane, a calculation formula in a case in which a workload refers to a load in busy hours may be obtained.

Alternatively, a specific calculation formula for calculating the quantity of to-be-adjusted physical resources may further be the following formula 3:

$$\frac{Num_{CP} \times CPLoad_{avg}}{Num_{CP} + X} = \frac{Num_{UP} \times UPLoad_{avg}}{Num_{UP} - X}. \quad \text{formula 3}$$

That is, $CPLoad_{busy}$ in formula 2 is replaced with the average CP load $CPLoad_{avg}$, and $UPLoad_{busy}$ is replaced with the average $UPLoad_{avg}$.

It should be noted that the calculation formula for the quantity of to-be-adjusted physical resources in this embodiment of the present invention is not limited to the foregoing calculation according to a maximum load value and an average value, and may also be calculation according to another load statistical value.

After the foregoing quantity X of to-be-adjusted physical resources is obtained, a specific adjusting manner includes, but is not limited to, any one or more of the following manners: changing a logic type of a board, modifying a software configuration, modifying a binding relationship between a service and a physical resource, submitting a resource to an operating system OS for automatic scheduling by the OS, performing virtualization, and performing cloud computing.

Specifically, the adjusting may include: in the case that the CP is used as the redundant plane, changing a logic type of boards, which are in boards of the CP and whose quantity is indicated by the quantity of to-be-adjusted physical resources, into a UP logic type to implement a UP function; or in the case that the UP is used as the redundant plane, changing a logic type of boards, which are in boards of the UP and whose quantity is indicated by the quantity of to-be-adjusted physical resources, into a CP logic type to implement a CP function.

Alternatively, the adjusting may include: in the case that the CP is used as the redundant plane, modifying a software configuration, deleting, according to the software configuration, CP software instances whose quantity corresponds to the quantity of to-be-adjusted physical resources, and creating, on physical resources that become idle, UP software instances whose quantity corresponds to the quantity of to-be-adjusted physical resources; or in the case that the UP is used as the redundant plane, modifying a software configuration, deleting, according to the software configuration, UP software instances whose quantity corresponds to the quantity of to-be-adjusted physical resources, and creating, on physical resources that become idle, CP software instances whose quantity corresponds to the quantity of to-be-adjusted physical resources.

Alternatively, the adjusting may include: in the case that the CP is used as the redundant plane, reducing, according to an indication of the quantity of to-be-adjusted physical resources, a quantity of physical resources used by CP software instances, and allocating, to UP software instances for use, physical resources whose quantity corresponds to a quantity of to-be-adjusted physical resources that become idle; or in the case that the UP is used as the redundant plane, reducing, according to an indication of the quantity of to-be-adjusted physical resources, a quantity of physical resources used by UP software instances, and allocating, to CP software instances for use, physical resources whose quantity corresponds to a quantity of to-be-adjusted physical resources that become idle.

Further, before performing the adjusting in the foregoing S203, the method further includes:

determining a to-be-adjusted physical resource according to the quantity of to-be-adjusted physical resources that is obtained through calculation; and prohibiting allocating a new service to the determined to-be-adjusted physical resource and waiting for a service that has been deployed on the determined to-be-adjusted physical resource to be terminated.

That is, a shutdown Shutdown operation is performed according to the quantity of to-be-adjusted physical resources that is obtained through calculation, that is, a new user is prohibited from being allocated to the to-be-adjusted physical resource (may be allocated to other physical resources that are not adjusted), and wait for an old user (a user deployed on these to-be-adjusted physical resources) to hang up naturally, and adjustment and allocation are then performed. In this way, the adjusting process does not interrupt a call of an existing user, a new user may also perform access normally, and the entire adjusting process does not adversely affect the end user.

Specifically, that CPU usage information is load information is used as an example for description.

S1. Collect the load information of the CP and collect the load information of the UP. For example, specifically, 15 minutes may be used as a granularity (a time interval) to collect statistics of CPU usage of each CPU in the CP in the time interval (for example, an average value in the time interval is acquired), and then an average value of the CPU usage of all the CPUs in the CP in the time interval is acquired, to obtain average CPU usage of the CP in the time interval, that is, a CP load CPLoad in the time interval. Similarly, statistics of CPU usage of each CPU in the UP in the time interval is collected (for example, an average value in the time interval is acquired), and then an average value of the CPU usage of all the CPUs in the UP in the time interval is acquired, to obtain average CPU usage of the UP in the time interval, that is, a UP load UPLoad in the time interval.

S2. Calculate a load of the CP when the CP is busy and a load of the UP when the UP is busy in a time cycle of an adjustment.

Specific calculation formulas may be:

the load of the CP when the CP is busy: $CPLoad_{Busy}$=Max $(CPload_1, CPload_2, \ldots, CPload_i, \ldots, CPload_M)$; and the load of the UP when the UP is busy: $UPLoad_{Busy}$=Max $(UPload_1, UPload_2, \ldots, UPload_i, \ldots, UPload_M)$, where $CPload_i$ refers to a CP load obtained by collecting statistics in the $i^{th}$ time interval, for example, a CP load obtained in the foregoing $i^{th}$ 15 minutes; and $UPload_i$ refers to a UP load obtained by collecting statistics in the $i^{th}$ time interval, for example, a UP load obtained in the foregoing $i^{th}$ 15 minutes. A maximum value in CP loads in M time intervals in the time cycle of the adjustment is the load of the CP when the CP is busy, and a maximum value in UP loads in the M time intervals in the time cycle of the adjustment is the load of the UP when the UP is busy. A value of M may be set as required, that is, the value of M may be set as required to determine an adjusting time, for example, the value of M may be determined according to a time when a network controller is generally idle, to determine the adjusting time.

Alternatively, the specific calculation formulas may also be:

a load of the CP on the $K^{th}$ day when the CP is busy: $CPLoad_{Busy,k}$=Max$(CPload_1, CPload_2, \ldots, CPload_{96})$; and a load of the UP on the $K^{th}$ day when the UP is busy: $UPLoad_{Busy,k}$=Max$(UPload_1, UPload_2, \ldots, UPload_{96})$, A total load of the CP when the CP is busy and that of the UP when the UP is busy in an adjustment cycle are calculated as the load of the CP when the CP is busy and the load of the UP when the UP is busy:

$CPLoad_{Busy}$=Avg$(CPLoad_{Busy,1}, CPLoad_{Busy,2}, \ldots, CPLoad_{Busy,N})$; and $UPLoad_{Busy}$=Avg$(UPLoad_{Busy,1}, UPLoad_{Busy,2}, \ldots, UPLoad_{Busy,N})$, where $CPLoad_{Busy,i}$ refers to the CP load on the $K^{th}$ day, and $UPLoad_{Busy,i}$ refers to the UP load on the $K^{th}$ day. A value of a quantity M of time intervals in the time cycle of the adjustment is set by a user as required, and the value of M may be set as required to determine an adjusting time, for example, the user determines the value of M according to a time when a network controller is generally idle, to determine the adjusting time.

It should be noted that in this embodiment of the present invention, the CP workload and the UP workload are represented by the load of the CP when the CP is busy and the load of the UP when the UP is busy. In another embodiment, the CP workload and the UP workload may also be represented by average loads, where calculation of an average CP load and an average UP load is as follows:

$$CPLoad_{avg} = \frac{CPload_1 + CPload_2 + \ldots + CPload_i + \ldots + CPload_M}{M}; \text{and}$$

$$UPLoad_{avg} = \frac{UPload_1 + UPload_2 + \ldots + UPload_i + \ldots + UPload_M}{M},$$

where there are a total of M time intervals in a time cycle of an adjustment, M CP loads and M UP loads are acquired, $CPload_i$ is a CP load obtained by collecting statistics in the $i^{th}$ time interval in M time intervals, $CPLoad_{avg}$ is an average CP load, $UPload_i$ is a UP load obtained by collecting statistics in the $i^{th}$ time interval in the M time intervals, and $UPLoad_{avg}$ is an average UP load.

S3. Determine whether the loads are balanced.

If an absolute value of $CPLoad_{Busy,k}$-$UPLoad_{Busy,k}$ is small, the CP load and the UP load are close and are basically balanced, and do not need to be adjusted, and S1 to S3 are performed.

If an absolute value of $CPLoad_{Busy,k}$-$UPLoad_{Busy,k}$ is large and greater than a preset threshold, it indicates that the loads are unbalanced, where one side is relatively idle, and the other side is relatively busy. In this case, an adjustment needs to be performed.

S4. Calculate an adjustment quantity, that is, a quantity of to-be-adjusted physical resources.

In this embodiment of the present invention, the CP with a larger workload being used as the scarce plane and the UP with a smaller workload being used as the redundant plane are used for description. A specific calculation formula for calculating the quantity of to-be-adjusted physical resources may include:

$$\frac{Num_{CP} \times CPLoad_{busy}}{Num_{CP} + X} = \frac{Num_{UP} \times UPLoad_{busy}}{Num_{UP} - X},$$

where $Num_{CP}$ is a quantity of CP physical resources currently allocated to the CP, $CPLoad_{busy}$ is a load of the CP when the CP is busy, and refers to an average load of all physical resources, for example, an average load of 10 CPUs in the CP when the 10 CPUs are busy; and $Num_{UP}$ is a quantity of UP physical resources currently allocated to the UP, $UPLoad_{busy}$ is a load of the UP when the UP is busy, and X is the quantity of to-be-adjusted physical resources.

S5. Adjust a physical resource.

After the foregoing quantity X of to-be-adjusted physical resources is obtained through calculation, a specific adjusting manner includes, but is not limited to, any one or more of the following manners: changing a logic type of a board, modifying a software configuration, modifying a binding relationship between a service and a physical resource, submitting a resource to an operating system OS for automatic scheduling by the OS, performing virtualization, and performing cloud computing.

It can be known from the description of the foregoing embodiment that the present invention has the following beneficial effects:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded. In addition, a quantity of to-be-adjusted physical resources can be obtained only according to a quantity of physical resources allocated to the CP and a quantity of physical resources allocated to the UP, and loads in busy hours obtained through calculation, where the calculation is simple and easy to implement.

Figure 3:
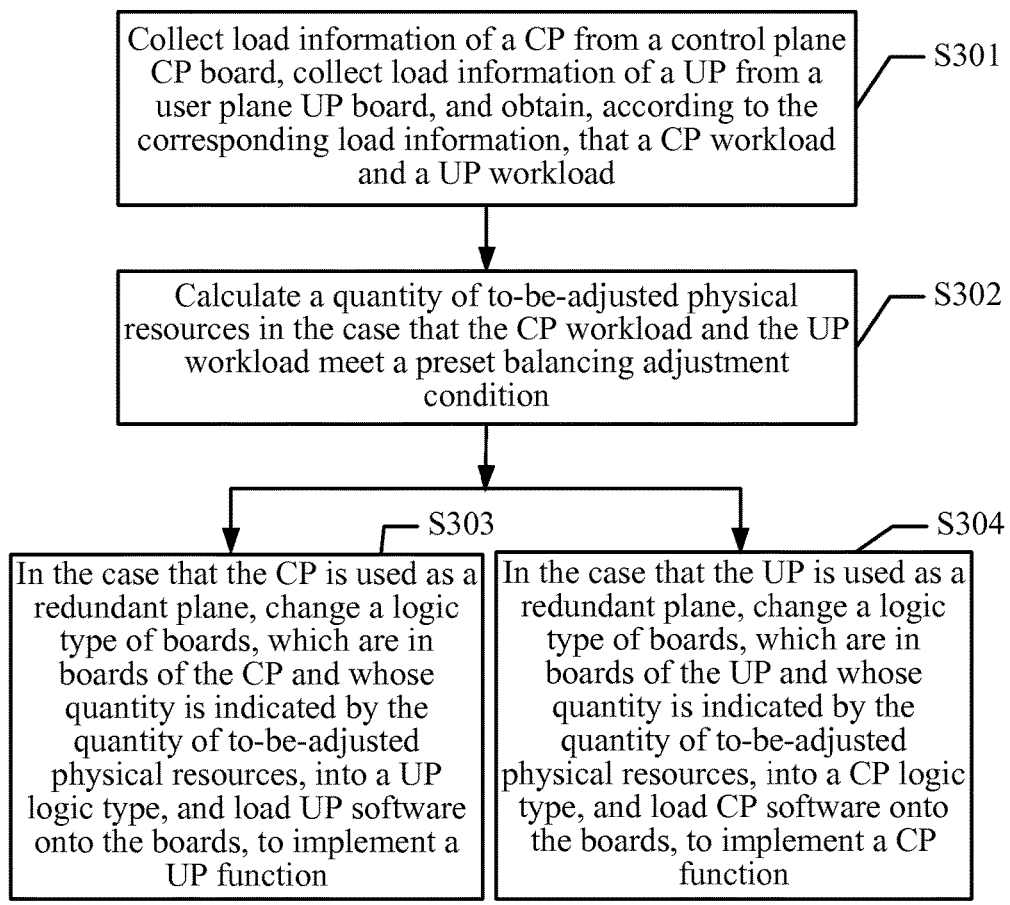
FIG. 3 is a schematic flowchart of a specific method for adjusting a physical resource according to an embodiment of the present invention.

Further refer to FIG. 3, FIG. 3 is a schematic flowchart of a specific method for adjusting a physical resource according to an embodiment of the present invention. In this embodiment of the present invention, adjusting a physical resource is completed by changing a logic type of a board. Specifically, the method includes:

S301: Collect load information of a CP from a control plane CP board, collect load information of a UP from a user plane UP board, and obtain, according to the corresponding load information, that a CP workload and a UP.

S302: Calculate a quantity of to-be-adjusted physical resources in the case that the CP workload and the UP workload meet a preset balancing adjustment condition.

S303: In the case that the CP is used as a redundant plane, change a logic type of boards, which are in boards of the CP and whose quantity is indicated by the quantity of to-be-adjusted physical resources, into a UP logic type, and load UP software onto the boards, to implement a UP function.

S304: In the case that the UP is used as a redundant plane, change a logic type of boards, which are in boards of the UP and whose quantity is indicated by the quantity of to-be-adjusted physical resources, into a CP logic type, and load CP software onto the boards, to implement a CP function.

It may be understood that the board in this embodiment is a unified board, that is, a physical board shared by the CP and the UP, and both functional software used to implement a CP logical function and functional software used to implement a UP logical function are disposed on the physical board. A logical function that a board may carry may be modified in a manner of changing a logic type. Specific modification may be directly starting the CP logical function of the board or starting the UP logical function of the board.

Figure 4:
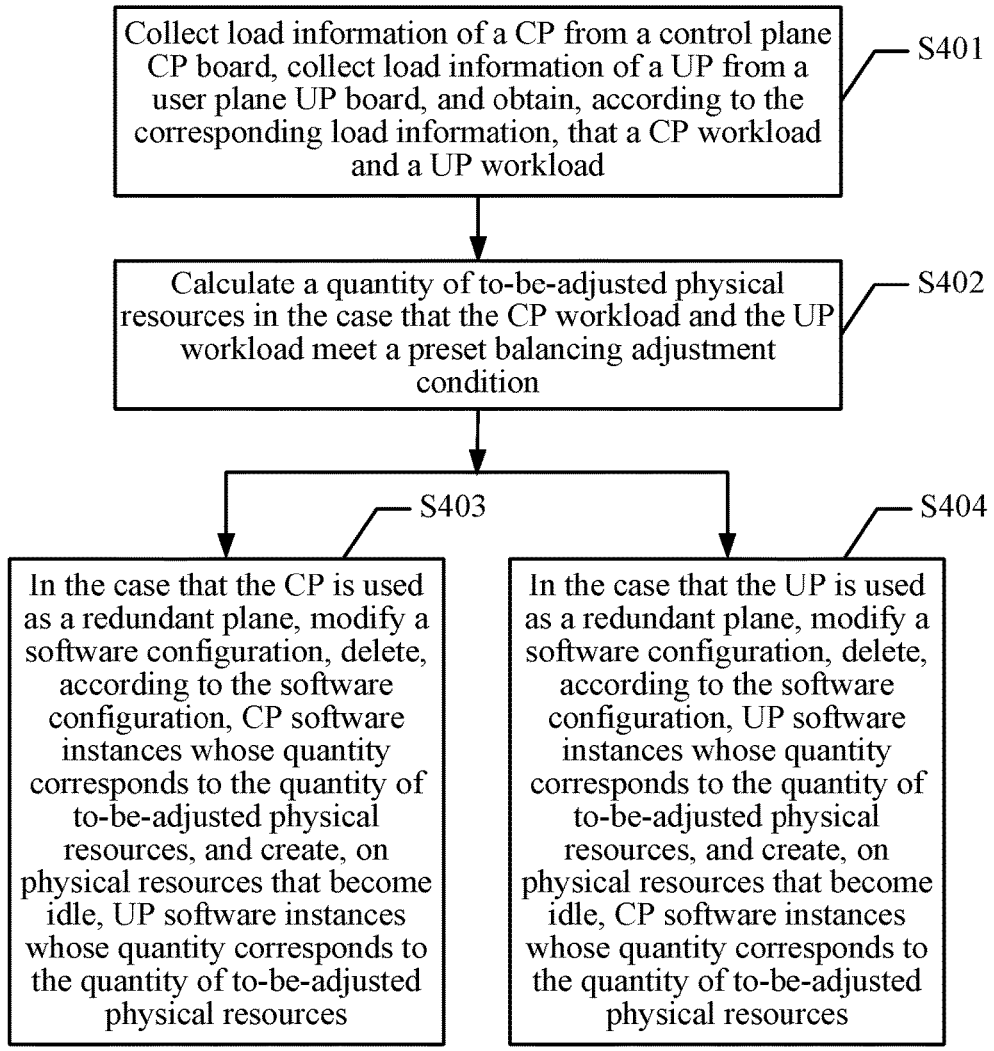
FIG. 4 is a schematic flowchart of another specific method for adjusting a physical resource according to an embodiment of the present invention.

FIG. 4 is a schematic flowchart of another specific method for adjusting a physical resource according to an embodiment of the present invention. In this embodiment of the present invention, adjusting a physical resource is completed by modifying a software configuration. Specifically, the method includes:

S401: Collect load information of a CP from a control plane CP board, collect load information of a UP from a user plane UP board, and obtain, according to the corresponding load information, that a CP workload and a UP.

S402: Calculate a quantity of to-be-adjusted physical resources in the case that the CP workload and the UP workload meet a preset balancing adjustment condition.

S403: In the case that the CP is used as a redundant plane, modify a software configuration, delete, according to the software configuration, CP software instances whose quantity corresponds to the quantity of to-be-adjusted physical resources, and create, on physical resources that become idle, UP software instances whose quantity corresponds to the quantity of to-be-adjusted physical resources.

S404: In the case that the UP is used as a redundant plane, modify a software configuration, delete, according to the software configuration, UP software instances whose quantity corresponds to the quantity of to-be-adjusted physical resources, and create, on physical resources that become idle, CP software instances whose quantity corresponds to the quantity of to-be-adjusted physical resources.

Figure 5:
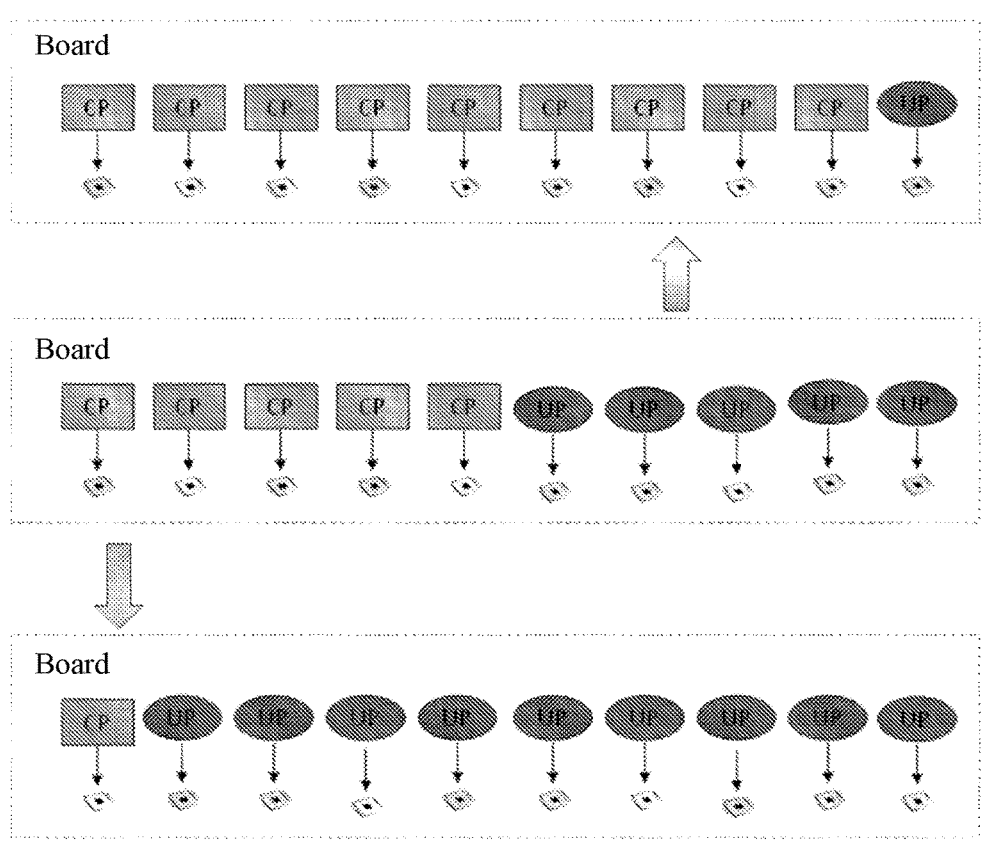
FIG. 5 is a schematic diagram of an adjustment in the method for adjusting a physical resource in FIG. 4.

For example, according to the quantity of to-be-adjusted physical resources, CP software instances are loaded for some of CPU resources in the board, and UP software instances are loaded for the other CPU resources in the board. Specifically, as shown in FIG. 5, FIG. 5 is a schematic diagram of an adjustment in the method for adjusting a physical resource in FIG. 4. As shown in FIG. 5, a physical resource may be, for example, a resource such as a CPU, a core of the CPU, or a thread. In FIG. 5, a square box indicates a UP software instance, and an oval box indicates a CP software instance. As shown in FIG. 5, a board has a total of 10 physical resources, which are evenly allocated to the UP and the CP at an initial stage. When the CP is busy and the UP is used as the redundant plane, a CP software instance is loaded, according to the quantity of to-be-adjusted physical resources, in the CPU corresponding to the UP. When the UP is busy and the CP is used as the redundant plane, a UP software instance is loaded, according to the quantity of to-be-adjusted physical resources, in a physical resource corresponding to the CP.

It may be understood that the board in this embodiment may be a unified board or two separated boards. In this embodiment, a physical resource used by the CP and a physical resource used by the UP are defined by configuring software.

Figure 6:
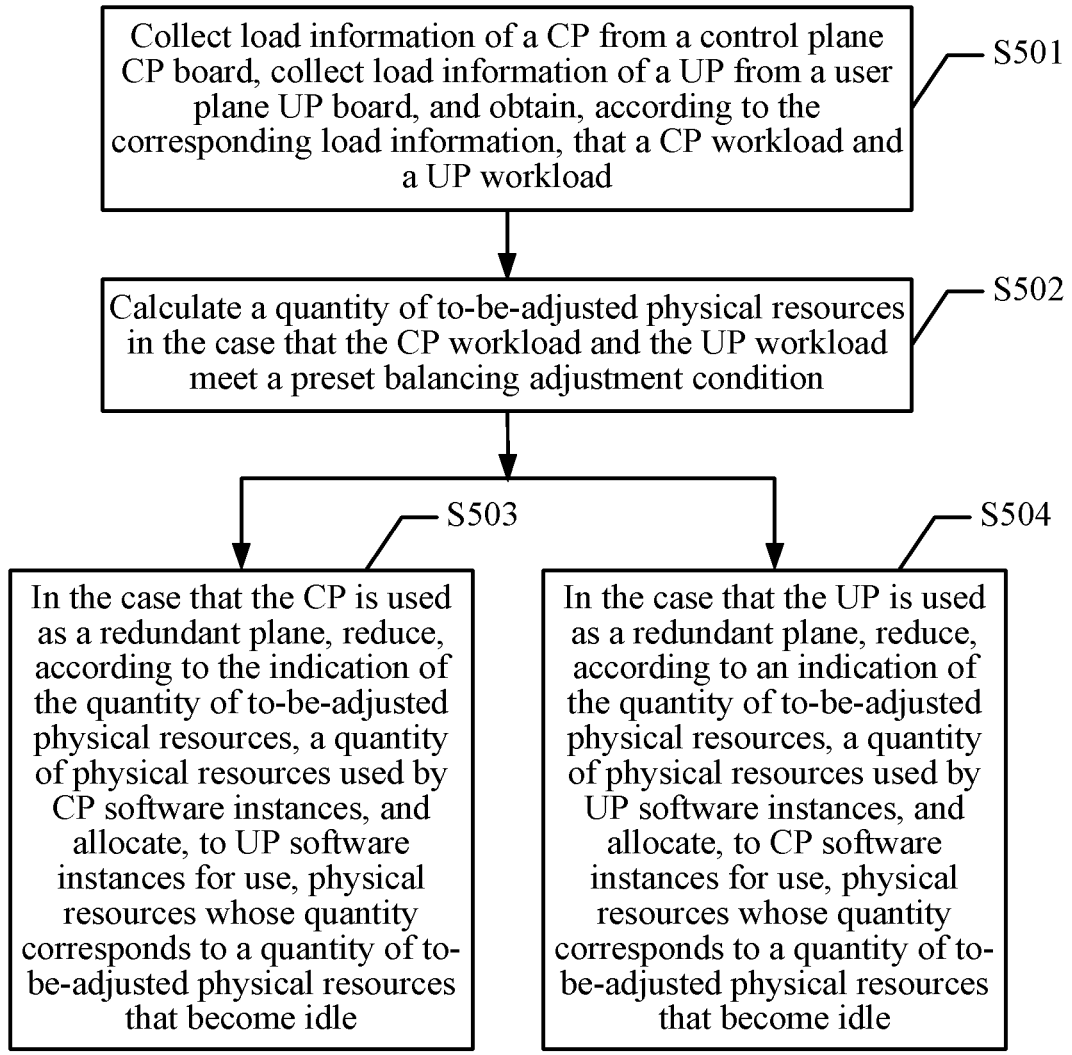
FIG. 6 is a schematic flowchart of still another specific method for adjusting a physical resource according to an embodiment of the present invention.

FIG. 6 is a schematic flowchart of still another specific method for adjusting a physical resource according to an embodiment of the present invention. In this embodiment of the present invention, adjusting a physical resource is completed by modifying a binding relationship between a service and a physical resource. Specifically, the method includes:

S501: Collect load information of a CP from a control plane CP board, collect load information of a UP from a user plane UP board, and obtain, according to the corresponding load information, that a CP workload and a UP.

S502: Calculate a quantity of to-be-adjusted physical resources in the case that the CP workload and the UP workload meet a preset balancing adjustment condition.

S503: In the case that the CP is used as a redundant plane, reduce, according to an indication of the quantity of to-be-adjusted physical resources, a quantity of physical resources used by CP software instances, and allocate, to UP software instances for use, physical resources whose quantity corresponds to a quantity of to-be-adjusted physical resources that become idle.

S504: In the case that the UP is used as a redundant plane, reduce, according to an indication of the quantity of to-be-adjusted physical resources, a quantity of physical resources used by UP software instances, and allocate, to CP software instances for use, physical resources whose quantity corresponds to a quantity of to-be-adjusted physical resources that become idle.

Figure 7:
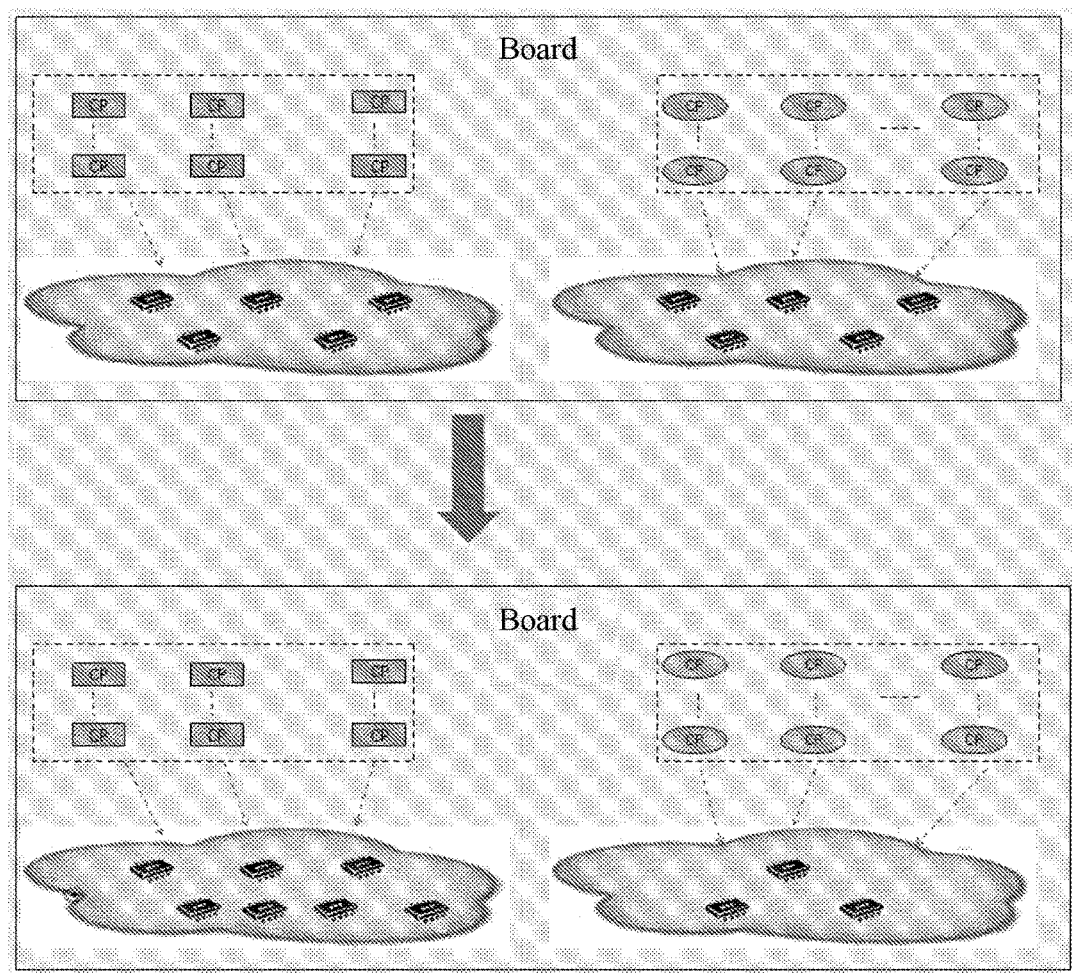
FIG. 7 is a schematic diagram of an adjustment in the method for adjusting a physical resource in FIG. 6.

For example, x % of computing resources are used to schedule a CP software instance, and (100−x) % of the computing resources are used to schedule a UP software process. Specifically, as shown in FIG. 7, FIG. 7 is a schematic diagram of an adjustment in the method for adjusting a physical resource in FIG. 6. As shown in FIG. 7, a pool used by the UP and a CP pool refer to physical resource pools including resources such as a CPU, a core of a CPU, and a thread. In FIG. 7, a square box indicates a UP software instance, and an oval box indicates a CP software instance. In the case that the UP is used as a redundant plane, a physical resource in the pool used by the UP is scheduled to the CP pool, to carry a CP service.

Figure 8:
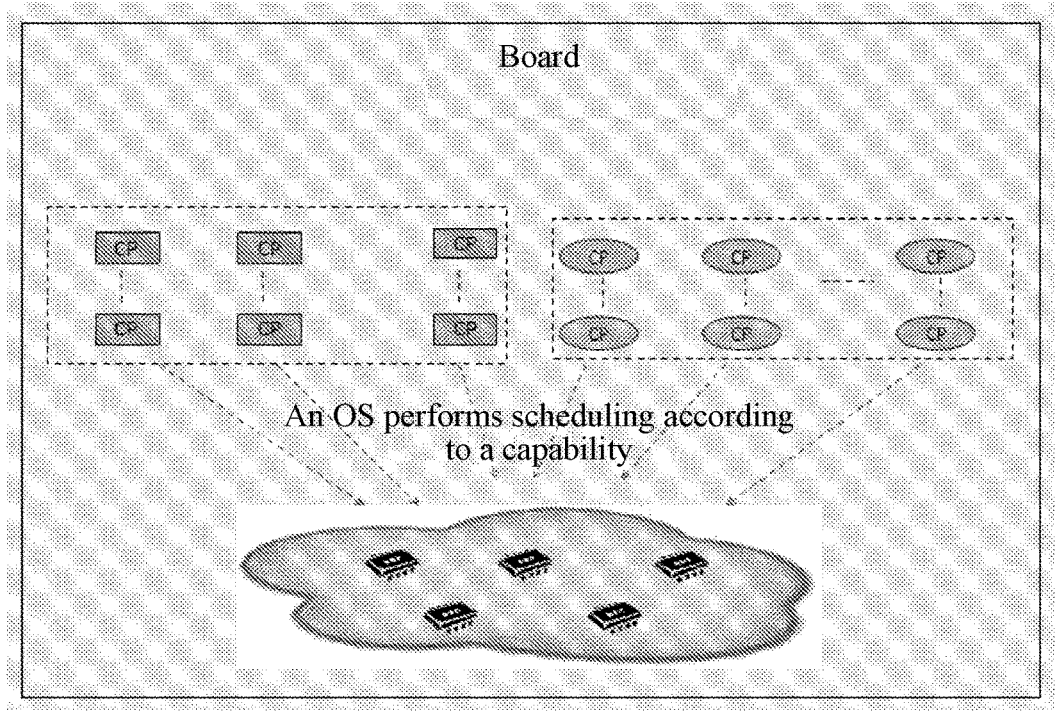
FIG. 8 is a schematic diagram of an adjustment based on scheduling by an operating system OS.

Further, the method for adjusting a physical resource specifically may be automatic scheduling by an OS. Specifically, as shown in FIG. 8, FIG. 8 is a schematic diagram of an adjustment based on scheduling by an operating system OS. As shown in FIG. 7, UP and CP pools share physical resource pools including a resource such as a CPU, a core of a CPU, or a thread, and the OS performs scheduling according to the quantity of to-be-adjusted physical resources, and a capability of the physical resource, to load a software instance of a corresponding plane. In FIG. 7, a square box indicates a UP software instance, and an oval box indicates a CP software instance.

It can be known from the description of the foregoing embodiment that the present invention has the following advantages:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded.

The following describes, in detail, an apparatus for adjusting a physical resource of the present invention.

Figure 9:
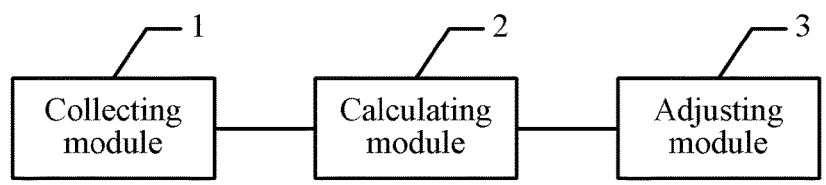
FIG. 9 is a schematic structural diagram of an apparatus for adjusting a physical resource according to an embodiment of the present invention.

Referring to FIG. 9, FIG. 9 is a schematic structural diagram of an apparatus for adjusting a physical resource according to an embodiment of the present invention. The apparatus for adjusting a physical resource in this embodiment of the present invention may be disposed in a device such as a controller. The controller may be, for example, a BSC or an RNC, which is not limited in this embodiment of the present invention. The apparatus may also be used as a third-party device, which is deployed outside a network controller and is communicatively connected to the controller. The apparatus for adjusting a physical resource may specifically include:

a collecting module 1, configured to collect load information of a CP from a control plane CP board, collect load information of a UP from a user plane UP board, and obtain, according to the corresponding load information, that a CP workload and a UP;

a calculating module 2, configured to calculate a quantity of to-be-adjusted physical resources in the case that the CP workload and the UP workload meet a preset balancing adjustment condition; and an adjusting module 3, configured to adjust physical resources of the CP and the UP according to the quantity of to-be-adjusted physical resources that is obtained through calculation.

The CP may include several software instances and physical resources (such as a CPU) used to carry the several software instances, and the software instances are used to implement a logical function of a control plane of a radio access network. The UP may also include several software instances and physical resources (such as a CPU) used to carry the several software instances, and the software instance is used to implement a logical function of a user plane of the radio access network.

The load information of the control plane CP and that of the user plane UP may include, but is not limited to, for example, one piece of or any combination of information such as CPU usage, a quantity of users, and throughput. The CP workload and the UP workload may refer to a load of the CP when the CP is busy and a load of the UP when the UP is busy; for example, one or any combination of the following: maximum CPU usage, a maximum quantity of users, and maximum throughput of the CP and those of the UP in two days; or an average CP load and an average UP load, for example, one or any combination of the following: average CPU usage, an average quantity of users, and average throughput of the CP and those of the UP in two days.

The collecting module 1 may collect and record CP and UP loads in a preset time interval, for example, 15 minutes, then, when a time cycle of an adjustment, for example, two days, comes, the collecting module 1 uses maximum load values as a load of the CP when the CP is busy and a load of the UP when the UP is busy, or averages all CP and UP loads in preset time intervals that are collected in the time cycle of the adjustment, that is, two days, to obtain the average CP load and the average UP load. The collecting module 1 may also collect and record load information in unequal time intervals, for example, randomly collect load statuses of the UP and the CP in time intervals such as 15 minutes and 30 minutes.

That the CP workload and the UP workload meet the preset balancing adjustment condition may refer to that an absolute value of a difference between or a ratio of the CP workload and the UP workload is beyond a preset range threshold. That is, one workload is greater than the other workload. In the case that the two values are equal or approximately equal (the difference between or the ratio of the two values is within the range threshold), the balancing adjustment condition is not met, and balance adjustment is not required.

A plane in the CP and the UP that has a smaller workload is a redundant plane, and a physical resource in the redundant plane is redundant and may be adjusted and invoked to the other plane for use. A plane with a larger workload is a scarce plane. The quantity of to-be-adjusted physical resources calculated by the calculating module 2 is specifically used to indicate a quantity of physical resources, such as a quantity of CPUs, which are invoked from the redundant plane to the scarce plane.

The calculating, by the calculating module 2, the quantity of to-be-adjusted physical resources may be directly using unused physical resource in the redundant plane as the quantity of to-be-adjusted physical resources according to a workload of the redundant plane; or only calculating the quantity of to-be-adjusted physical resources according to a physical resource requirement of the scarce plane; or calculating the quantity of to-be-adjusted physical resources according to a quantity of CP physical resources allocated to the CP, the CP workload, a quantity of UP physical resources currently allocated to the UP, and the UP workload.

A specific adjusting manner used by the adjusting module 3 includes, but is not limited to, any one or more of the following manners: automatically changing a logic type of a board, modifying a software configuration, modifying a binding relationship between a service and a physical resource, submitting a resource to an operating system OS for automatic scheduling by the OS, performing virtualization, and performing cloud computing.

Specifically, when adjusting a physical resource, the adjusting module 3 is specifically configured to: in the case that the CP is used as the redundant plane, change a logic type of boards, which are in boards of the CP and whose quantity is indicated by the quantity of to-be-adjusted physical resources, into a UP logic type to implement a UP function; or in the case that the UP is used as the redundant plane, change a logic type of boards, which are in boards of the UP and whose quantity is indicated by the quantity of to-be-adjusted physical resources, into a CP logic type to implement a CP function.

Alternatively, the adjusting module 3 is specifically configured to: in the case that the CP is used as the redundant plane, modify a software configuration, delete, according to the software configuration, CP software instances whose quantity corresponds to the quantity of to-be-adjusted physical resources, and create, on physical resources that become idle, UP software instances whose quantity corresponds to the quantity of to-be-adjusted physical resources; or in the case that the UP is used as the redundant plane, modify a software configuration, delete, according to the software configuration, UP software instances whose quantity corresponds to the quantity of to-be-adjusted physical resources, and create, on physical resources that become idle, CP software instances whose quantity corresponds to the quantity of to-be-adjusted physical resources.

Alternatively, the adjusting module 3 is specifically configured to: in the case that the CP is used as the redundant plane, reduce, according to an indication of the quantity of to-be-adjusted physical resources, a quantity of physical resources used by CP software instances, and allocate, to UP software instances for use, physical resources whose quantity corresponds to a quantity of to-be-adjusted physical resources that become idle; or in the case that the UP is used as the redundant plane, reduce, according to an indication of the quantity of to-be-adjusted physical resources, a quantity of physical resources used by UP software instances, and allocate, to CP software instances for use, physical resources whose quantity corresponds to a quantity of to-be-adjusted physical resources that become idle.

In this embodiment, the adjusting module 3 may specifically be an adjusting unit, configured to automatically adjust physical resources of the CP and the UP according to the quantity of to-be-adjusted physical resources that is obtained through calculation. Alternatively, the adjusting module 3 is an instructing unit, configured to send adjustment instruction information according to the quantity of to-be-adjusted physical resources that is obtained through calculation, to instruct a user to adjust physical resources of the CP and the UP according to the quantity of to-be-adjusted physical resources that is obtained through calculation.

Specifically, for specific implementation of the apparatus for adjusting a physical resource in this embodiment of the present invention, refer to the descriptions of the foregoing embodiments corresponding to FIG. 1 to FIG. 8, which are not described herein again.

It can be known from the description of the foregoing embodiment that the present invention has the following beneficial effects:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded.

Figure 10:
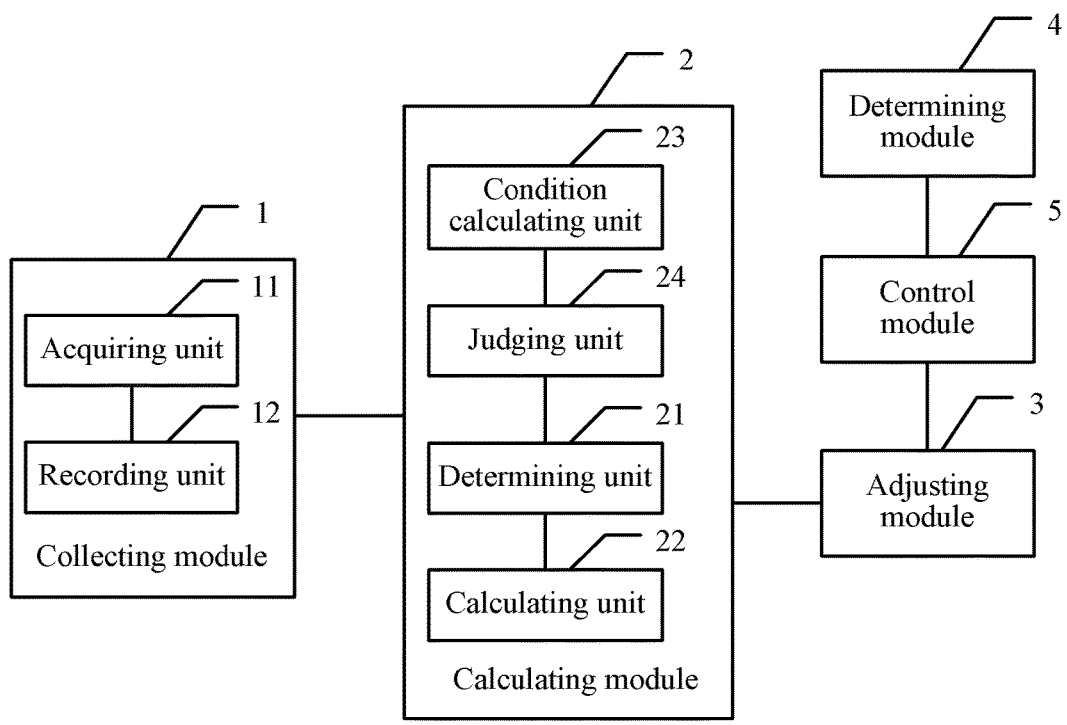
FIG. 10 is a schematic structural diagram of another apparatus for adjusting a physical resource according to an embodiment of the present invention.

Further referring to FIG. 10, FIG. 10 is a schematic structural diagram of another apparatus for adjusting a physical resource according to an embodiment of the present invention. The apparatus for adjusting a physical resource in this embodiment of the present invention may be disposed in a device such as a controller. The controller may be, for example, a BSC or an RNC, which is not limited in this embodiment of the present invention. The apparatus may also be used as a third-party device, which is deployed outside a network controller and is communicatively connected to the controller. The apparatus for adjusting a physical resource may specifically include the collecting module 1, the calculating module 2, and the adjusting module 3 in the foregoing embodiment corresponding to the FIG. 9. In this embodiment of the present invention, the collecting module 1 in the apparatus for adjusting a physical resource may specifically include:

an acquiring unit 11, configured to collect the load information of the CP from the control plane CP board, and collect the load information of the UP from the user plane UP board, where the load information includes any one or more of the following: CPU usage, a quantity of users, and throughput, where the load information of the CP and the load information of the UP that are acquired by the acquiring unit 11 may be actively reported by the CP and the UP in a preset time threshold, and a load in busy hours may be a maximum load of the CP or the UP in a preset time cycle; and a recording unit 12, configured to use a maximum value in CP load capacities in a preset time cycle or an average value of the load capacities as the workload of the CP, and use a maximum value in UP load capacities in the preset time cycle or an average value of the load capacities as the workload of the UP.

The recording unit 12 records a load of a corresponding plane in busy hours for the calculating module 2 to use in calculation.

Further, the calculating module 2 in the apparatus for adjusting a physical resource may specifically include:

a determining unit 21, configured to determine, in the case that the CP workload and the UP workload meet the preset balancing adjustment condition, a quantity of CP physical resources currently allocated to the CP and a quantity of UP physical resources currently allocated to the UP; and a calculating unit 22, configured to calculate the quantity of to-be-adjusted physical resources according to the quantity of CP physical resources currently allocated to the CP, the CP workload, the quantity of UP physical resources currently allocated to the UP, and the UP workload.

In the case that the load of the CP when the CP is busy and the load of the UP when the UP is busy are unbalanced, that is, the load of one plane in busy hours is larger, and the load of the other plane in busy hours is smaller, it may be considered that the balancing adjustment condition is met, and adjustment needs to be performed.

The quantity of CP physical resources allocated to the CP and the quantity of UP physical resources allocated to the UP may be a quantity of CP physical resources allocated to the CP and a quantity of UP physical resources allocated to the UP respectively that are recorded after a network controller is established, or a quantity of CP physical resources and a quantity of UP physical resources that are recorded after a previous adjustment of physical resources.

In this embodiment, the principle of calculating the quantity of to-be-adjusted physical resources by the calculating unit 22 includes: an absolute value of a difference between or a ratio of a load value which is obtained by sharing a current total workload of the CP on each CP physical resource that is obtained after adjusting is performed according to the quantity of to-be-adjusted physical resources, and a load value which is obtained by sharing a current total workload of the UP on each UP physical resource that is obtained after adjusting is performed according to the quantity of to-be-adjusted physical resources is within a preset range threshold. For a specific calculation formula, refer to formula 1, formula 2 and formula 3 in the foregoing method embodiments.

Further, the calculating module 2 may further include the following units, configured to determine whether the balancing adjustment condition is met, including:

a condition calculating unit 23, configured to calculate an absolute value of a difference between or a ratio of the CP workload and the UP workload; and a judging unit 24, configured to determine whether a result obtained through calculation by the condition calculating unit 23 is beyond the preset range threshold, where if the result is beyond the preset range threshold, the CP workload and the UP workload meet the preset balancing adjustment condition, and notify the determining unit.

Further, in this embodiment of the present invention, the adjusting module 3 in the apparatus for adjusting a physical resource is specifically configured to: in the case that the CP is used as the redundant plane, change a logic type of boards, which are in boards of the CP and whose quantity is indicated by the quantity of to-be-adjusted physical resources, into a UP logic type to implement a UP function; or in the case that the UP is used as the redundant plane, change a logic type of boards, which are in boards of the UP and whose quantity is indicated by the quantity of to-be-adjusted physical resources, into a CP logic type to implement a CP function.

Alternatively, the adjusting module 3 is specifically configured to: in the case that the CP is used as the redundant plane, change a logic type of boards, which are in boards of the CP and whose quantity is indicated by the quantity of to-be-adjusted physical resources, into a UP logic type to implement a UP function; or in the case that the UP is used as the redundant plane, change a logic type of boards, which are in boards of the UP and whose quantity is indicated by the quantity of to-be-adjusted physical resources, into a CP logic type to implement a CP function.

Alternatively, the adjusting module 3 is specifically configured to: in the case that the CP is used as the redundant plane, modify a software configuration, delete, according to the software configuration, CP software instances whose quantity corresponds to the quantity of to-be-adjusted physical resources, and create, on physical resources that become idle, UP software instances whose quantity corresponds to the quantity of to-be-adjusted physical resources; or in the case that the UP is used as the redundant plane, modify a software configuration, delete, according to the software configuration, UP software instances whose quantity corresponds to the quantity of to-be-adjusted physical resources, and create, on physical resources that become idle, CP software instances whose quantity corresponds to the quantity of to-be-adjusted physical resources.

Certainly, the adjusting module 3 may specifically have all the foregoing three physical resource adjusting functions, and may select a manner according to a specific requirement to adjust a physical resource.

Further, in this embodiment of the present invention, before performing the adjusting, the adjusting module 3 may further include the following modules to perform corresponding processing:

a determining module 4, configured to determine a to-be-adjusted physical resource according to the quantity of to-be-adjusted physical resources that is obtained through calculation; and a control module 5, configured to prohibit allocating a new service to the determined to-be-adjusted physical resource and wait for a service that has been deployed on the determined to-be-adjusted physical resource to be terminated.

That is, a shutdown Shutdown operation is performed according to the quantity of to-be-adjusted physical resources that is obtained through calculation, and after the determining module 4 determines the to-be-adjusted physical resource, the control module 5 prohibits allocating a new user to the to-be-adjusted physical resource (may allocate the new user to other physical resources that are not adjusted), and waits for an old user (a user deployed on these to-be-adjusted physical resources) to hang up naturally, and adjustment and allocation are then performed. In this way, the adjusting process does not interrupt a call of an existing user, a new user may also perform access normally, and the entire adjusting process does not adversely affect the end user.

Specifically, for specific implementation of the apparatus for adjusting a physical resource in this embodiment of the present invention, refer to the descriptions of the foregoing embodiments corresponding to FIG. 1 to FIG. 8, which are not described herein again.

It can be known from the description of the foregoing embodiment that the present invention has the following advantages:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded. In addition, a quantity of to-be-adjusted physical resources can be obtained only according to a quantity of physical resources allocated to the CP and a quantity of physical resources allocated to the UP, and loads in busy hours obtained through calculation, where the calculation is simple and easy to implement.

Figure 11:
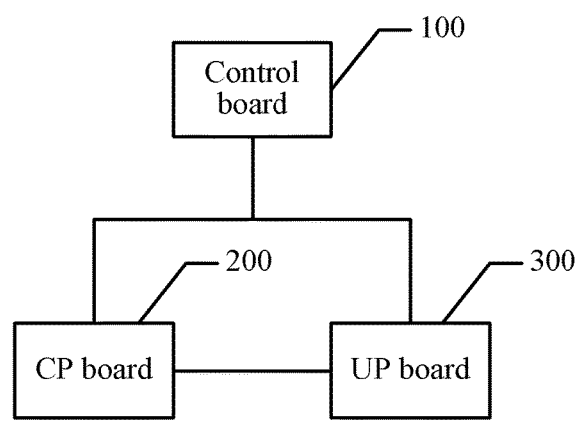
FIG. 11 is a schematic structural diagram of a controller according to an embodiment of the present invention.

Further referring to FIG. 11, FIG. 11 is a schematic structural diagram of a controller according to an embodiment of the present invention. The controller of this embodiment of the present invention includes a control board 100, a CP board 200, and a UP board 300, where:

the control board 100 is configured to collect load information of CP from the CP board 200, collect load information of UP from the UP board 300, and obtain, according to the corresponding load information, that a CP workload and a UP; calculate a quantity of to-be-adjusted physical resources in the case that the CP workload and the UP workload meet a preset balancing adjustment condition; and adjust physical resources of the CP board 200 and the UP board 300 according to the quantity of to-be-adjusted physical resources that is obtained through calculation.

Specifically, the control board 100 of this embodiment of the present invention includes the foregoing apparatus for adjusting a physical resource in the embodiments corresponding to FIG. 9 and FIG. 10. For specific implementation of the control board 100, refer to the foregoing method and apparatus embodiments corresponding to FIG. 1 to FIG. 9, which are not described herein again.

It can be known from the description of the foregoing embodiment that the present invention has the following advantages:

A physical resource can be adjusted and allocated automatically according to load statuses of CP and UP, so that the CP and the UP share a physical resource, thereby balancing a load of a device, promoting usage of the device, and reducing a possibility that the CP and the UP are overloaded. In addition, a quantity of to-be-adjusted physical resources can be obtained only according to a quantity of physical resources allocated to the CP and a quantity of physical resources allocated to the UP, and loads in busy hours obtained through calculation, where the calculation is simple and easy to implement.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. Any equivalent modification made in accordance with the claims of the present invention shall fall within the scope of the present invention.

What is claimed is:
1. A method for adjusting a physical resource, comprising:
collecting load information of a control plane (CP) from a CP board, collecting load information of a user plane (UP) from a UP board, and obtaining a CP workload according to the load information of the CP and a UP workload according to the load information of the UP, wherein the collecting comprises:
collecting the load information of the CP in a preset time cycle from the CP board, collecting the load information of the UP in the preset time cycle from the UP board, and obtaining at least one CP load capacity according to the load information of the CP in the preset time cycle, and at least one UP load capacity according to the load information of the UP in the preset time cycle, wherein the load information of the CP and the load information of the UP comprises any one or more of the following: central processing unit (CPU) usage, a quantity of users, and throughput; and
determining a maximum value in the at least one CP load capacity or an average value of the at least one CP load capacity as the CP workload, and determining a maximum value in the at least one UP load capacity or an average value of the at least one UP load capacity as the UP workload;
calculating a quantity of to-be-adjusted physical resources when the CP workload and the UP workload meet a preset balancing adjustment condition, wherein that the CP workload and the UP workload meet the preset balancing adjustment condition comprises:
an absolute value of a difference between the CP workload and the UP workload is beyond a preset range threshold; or
a ratio of the CP workload and the UP workload is beyond the preset range threshold; and
adjusting physical resources of the CP and the UP according to the quantity of to-be-adjusted physical resources, wherein the adjusting physical resources of the CP and the UP according to the quantity of to-be-adjusted physical resources comprises:
when the CP workload is smaller than the UP workload, changing a logic type of CP boards, having a first quantity indicated by the quantity of to-be-adjusted physical resources, into a UP logic type to implement a UP function; or
when the UP workload is smaller than the CP workload, changing a logic type of UP boards, having a second quantity indicated by the quantity of to-be-adjusted physical resources, into a CP logic type to implement a CP function.

2. The method according to claim 1, wherein the adjusting physical resources of the CP and the UP according to the quantity of to-be-adjusted physical resources comprises:
automatically adjusting the physical resources of the CP and the UP according to the quantity of to-be-adjusted physical resources; or
sending adjustment instruction information according to the quantity of to-be-adjusted physical resources, to instruct a user to adjust the physical resources of the CP and the UP according to the quantity of to-be-adjusted physical resources.

3. The method according to claim 1, wherein the calculating a quantity of to-be-adjusted physical resources when the CP workload and the UP workload meet a preset balancing adjustment condition comprises:
determining, when the CP workload and the UP workload meet the preset balancing adjustment condition, a quantity of CP physical resources currently allocated to the CP and a quantity of UP physical resources currently allocated to the UP; and
calculating the quantity of to-be-adjusted physical resources according to the quantity of CP physical resources currently allocated to the CP, the CP workload, the quantity of UP physical resources currently allocated to the UP, and the UP workload.

4. The method according to claim 3, wherein the calculating a quantity of to-be-adjusted physical resources comprises:
calculating the quantity of to-be-adjusted physical resources, so that an absolute value of a difference between a first load value and a second load value is within the preset range threshold; or
calculating the quantity of to-be-adjusted physical resources, so that a ratio of the first load value and the second load value is within the preset range threshold.

5. An apparatus for adjusting a physical resource, comprising:
a memory; and
at least one processor coupled to the memory, the memory including instructions executable by the at least one processor for performing:
collecting load information of a control plane (CP) from a CP board, collecting load information of a user plane (UP) from a UP board, and obtaining a CP workload according to the load information of the CP and a UP workload according to the load information of the UP, wherein the collecting comprises:
collecting the load information of the CP in a preset time cycle from the CP board, collecting the load information of the UP in the preset time cycle from the UP board, and obtaining at least one CP load capacity according to the load information of the CP in the preset time cycle, and at least one UP load capacity according to the load information of the UP in the preset time cycle, wherein the load information of the CP and the load information of the UP comprises at least one of the following: central processing unit (CPU) usage, a quantity of users, and throughput; and
determining a maximum value in the at least one CP load capacity or an average value of the at least one CP load capacity as the CP workload, and determining a maximum value in the at least one UP load capacity or an average value of the at least one UP load capacity as the UP workload; and
calculating a quantity of to-be-adjusted physical resources when the CP workload and the UP workload meet a preset balancing adjustment condition, wherein that the CP workload and the UP workload meet the preset balancing adjustment condition comprises:
an absolute value of a difference between the CP workload and the UP workload is beyond a preset range threshold; or
a ratio of the CP workload and the UP workload is beyond the preset range threshold; and
adjusting physical resources of the CP and the UP according to the quantity of to-be-adjusted physical resources, wherein the adjusting comprises:
when the CP workload is smaller than the UP workload, changing a logic type of CP boards, having a first quantity indicated by the quantity of to-be-adjusted physical resources, into a UP logic type to implement a UP function; or when the UP workload is smaller than the CP workload, changing a logic type of UP boards, having a second quantity indicated by the quantity of to-be-adjusted physical resources, into a CP logic type to implement a CP function.

6. The apparatus according to claim 5, wherein the instructions for the adjusting comprises:
automatically adjusting the physical resources of the CP and the UP according to the quantity of to-be-adjusted physical resources; or
sending adjustment instruction information according to the quantity of to-be-adjusted physical resources, to instruct a user to adjust the physical resources of the CP and the UP according to the quantity of to-be-adjusted physical resources.

7. The apparatus according to claim 5, wherein the memory further comprises instructions executable by the at least one processor for performing:
determining when the CP workload and the UP workload meet the preset balancing adjustment condition, a quantity of CP physical resources currently allocated to the CP and a quantity of UP physical resources currently allocated to the UP; and
wherein the instructions for the calculating comprises calculating the quantity of to-be-adjusted physical resources according to the quantity of CP physical resources currently allocated to the CP, the CP workload, the quantity of UP physical resources currently allocated to the UP, and the UP workload.

8. The apparatus according to claim 7, wherein the instructions for the calculating comprises:
calculating the quantity of to-be-adjusted physical resources, so that an absolute value of a difference between a first load value and a second load value is within the preset range threshold; or
calculating the quantity of to-be-adjusted physical resources, so that a ratio of the first load value and the second load value is within a preset range threshold.

9. The apparatus according to claim 5, wherein the apparatus is disposed in a controller.

10. A controller comprising:
a control board;
a control plane (CP) board; and
a user plane (UP) board, the control board comprises a memory and at least one processor coupled to the memory, the memory including instructions executable by the at least one processor for performing:
collecting load information of a CP from the CP board, collecting load information of a UP from the UP board, and obtaining a CP workload according to the load information of the CP and a UP workload according to the load information of the UP, wherein the collecting comprises:
collecting the load information of the CP in a preset time cycle from the CP board, collecting the load information of the UP in the preset time cycle from the UP board, and obtaining at least one CP load capacity according to the load information of the CP in the preset time cycle, and at least one UP load capacity according to the load information of the UP in the preset time cycle, wherein the load information of the CP and the load information of the UP comprises at least one of the following: central processing unit (CPU) usage, a quantity of users, and throughput; and
determining a maximum value in the at least one CP load capacity or an average value of the at least one CP load capacity as the CP workload, and determining a maximum value in the at least one UP load capacity or an average value of the at least one UP load capacity as the UP workload; and
calculating a quantity of to-be-adjusted physical resources when the CP workload and the UP workload meet a preset balancing adjustment condition, wherein that the CP workload and the UP workload meet the preset balancing adjustment condition comprises:
an absolute value of a difference between the CP workload and the UP workload is beyond a preset range threshold; or
a ratio of the CP workload and the UP workload is beyond the preset range threshold; and
adjusting physical resources of the CP and the UP according to the quantity of to-be-adjusted physical resources, wherein the adjusting comprises:
when the CP workload is smaller than the UP workload, changing a logic type of CP boards, having a first quantity indicated by the quantity of to-be-adjusted physical resources, into a UP logic type to implement a UP function; or
when the UP workload is smaller than the CP workload, changing a logic type of UP boards, having a second quantity indicated by the quantity of to-be-adjusted physical resources, into a CP logic type to implement a CP function.

* * * * *

UNITED STATES PATENT AND TRADEMARK OFFICE
CERTIFICATE OF CORRECTION

PATENT NO. : 10,142,997 B2
APPLICATION NO. : 14/951629
DATED : November 27, 2018
INVENTOR(S) : Qucai Chen et al.

Page 1 of 1

It is certified that error appears in the above-identified patent and that said Letters Patent is hereby corrected as shown below:

In the Claims

In Column 27, Line 35:
In Claim 8, delete "the" and insert -- a -- therefor.

In Column 27, Line 38:
In Claim 8, delete "a" and insert -- the -- therefor.

Signed and Sealed this
Third Day of September, 2019

Andrei Iancu
*Director of the United States Patent and Trademark Office*